(12) United States Patent
Sloo et al.

(10) Patent No.: US 8,935,796 B2
(45) Date of Patent: Jan. 13, 2015

(54) SEGMENT BASED DIGITAL CONTENT PROTECTION

(75) Inventors: David Sloo, Menlo Park, CA (US); Peter Barrett, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1787 days.

(21) Appl. No.: 12/049,129

(22) Filed: Mar. 14, 2008

(65) Prior Publication Data
US 2009/0235361 A1    Sep. 17, 2009

(51) Int. Cl.
G06F 21/00    (2013.01)
H04L 29/06    (2006.01)
G06F 21/10    (2013.01)

(52) U.S. Cl.
CPC ..................................... *G06F 21/10* (2013.01)
USPC .......................................................... 726/26

(58) Field of Classification Search
CPC ......... G06F 21/10; G06F 21/00; G06F 21/60; H04L 63/10
USPC .............................................. 705/50–51, 54
See application file for complete search history.

(56) References Cited

U.S. PATENT DOCUMENTS

| | | | | |
|---|---|---|---|---|
| 5,629,980 | A * | 5/1997 | Stefik et al. ...................... | 705/54 |
| 6,006,332 | A | 12/1999 | Rabne et al. | |
| 6,128,735 | A * | 10/2000 | Goldstein et al. ............. | 713/166 |
| 6,314,409 | B2 * | 11/2001 | Schneck et al. ................. | 705/54 |
| 6,332,025 | B2 | 12/2001 | Takahashi et al. | |
| 6,560,651 | B2 | 5/2003 | Katz et al. | |
| 6,725,271 | B1 | 4/2004 | Maton | |
| 6,760,536 | B1 * | 7/2004 | Amir et al. ..................... | 386/344 |
| 6,876,984 | B2 * | 4/2005 | Tadayon et al. ................. | 705/51 |
| 7,031,471 | B2 | 4/2006 | Stefik et al. | |
| 7,065,505 | B2 | 6/2006 | Stefik et al. | |
| 7,120,604 | B2 | 10/2006 | Maari | |
| 7,940,935 | B2 * | 5/2011 | Nakahara et al. ............. | 380/278 |
| 2002/0019823 | A1 * | 2/2002 | Layeghi .......................... | 707/10 |
| 2002/0032864 | A1 * | 3/2002 | Rhoads et al. ................ | 713/176 |
| 2002/0077987 | A1 * | 6/2002 | Hasegawa ....................... | 705/52 |
| 2004/0003281 | A1 * | 1/2004 | Sonoda et al. ................ | 713/200 |
| 2005/0154678 | A1 * | 7/2005 | Schmelzer ...................... | 705/51 |

(Continued)

FOREIGN PATENT DOCUMENTS

EP    0778513 A2    6/1997

OTHER PUBLICATIONS

Bellini et al., "An Integrated Framework for Automating Content Enrichment, Packaging and Distribution with DRM Support" http://ftp.informatik.rwth-aachen.de/Publications/CEUR-WS/Vol-201/44.pdf, 8 pages.

Suomalainen, "Content Protection and Authorized Sharing for Mobile Broadcast," Sep. 5, 2005 http://www.tml.tkk.fi/Studies/T-111.590/2005/students/papers/paper_58881A.pdf.

(Continued)

*Primary Examiner* — Lisa Lewis
(74) *Attorney, Agent, or Firm* — Kusnyer Ladislav; Sade Fashokun; Micky Minhas (57) ABSTRACT

Techniques are disclosed herein for applying different content protection schemes to different segments of digital content. A method for protecting digital content includes determining segments within digital content that is organized to allow presentation in a certain order. Each of the segments is assigned to a category of a group of categories. Each of the categories has a different content protection scheme associated therewith. One of the protection schemes is applied to each segment based on the category associated with the segment.

20 Claims, 8 Drawing Sheets

(56) References Cited

U.S. PATENT DOCUMENTS

| | | |
|---|---|---|
| 2005/0216548 A1 | 9/2005 | Wormington et al. |
| 2006/0178997 A1* | 8/2006 | Schneck et al. ............. 705/50 |
| 2006/0190776 A1* | 8/2006 | Oostveen et al. ............ 714/700 |
| 2006/0229990 A1* | 10/2006 | Shimoji et al. ............. 705/50 |
| 2007/0027812 A1 | 2/2007 | Ogawa et al. |
| 2007/0047763 A1 | 3/2007 | Levy |
| 2007/0100755 A1 | 5/2007 | Kragt et al. |
| 2007/0124776 A1 | 5/2007 | Welk et al. |
| 2007/0156534 A1 | 7/2007 | Lerner et al. |
| 2007/0208953 A1* | 9/2007 | Durand et al. ............. 713/193 |
| 2008/0162358 A1* | 7/2008 | Patsiokas et al. ............. 705/57 |
| 2010/0145794 A1* | 6/2010 | Barger et al. ............. 705/14.45 |
| 2012/0260346 A1* | 10/2012 | Carey et al. ................ 726/26 |

OTHER PUBLICATIONS

Bellini et al., "Multimedia Music Distribution and Sharing Among Mediateques, Archives and Their Attendees," Proceedings of the Second International Conference on Web Delivering of Music (WEBDELMUSCI '02), 2002 http://ieeexplore.ieee.org/Xplore/login.jsp?url=/iel5/8383/26401/01176190.pdf.

Schmucker et al., "Promotional and Commercial Content Distribution Based on a Legal and Trusted P2P Framework," Proceedings of the Seventh IEEE International Conference on E-Commerce Technology (CEC'05), 2005 http://ieeexplore.ieee.org/iel5/10218/32584/01524083.pdf?arnumber=1524083.

* cited by examiner

SEGMENT BASED DIGITAL CONTENT PROTECTION

BACKGROUND

Owners of digital content such as movies, television programs, advertisements, newscasts, sport telecasts, e-books, software, and video games naturally must distribute their digital content in order to profit. However, distribution of their digital content makes the content vulnerable to improper uses, such as illegal copying and re-distribution.

Digital rights management (DRM) are technologies used by content owners to control access to digital content. Using DRM, the content owner can achieve a variety of access controls such as requiring a license to play the digital content at all, preventing the digital content from being copied, limiting which device can play the digital content, placing an expiration date on playing the digital content, allowing the digital content to be played a certain number of times, etc.

A DRM process typically has an enforcement mechanism at the client device that plays the digital content in order to enforce a set of rules devised by the content owner. As an example, the owner might encrypt the digital content and provide a means to obtain cryptographic keys to unlock the digital content. The enforcement mechanism obtains the cryptographic keys and uses them to unlock the encrypted digital content. Moreover, the enforcement mechanism only allows certain actions to be performed, such as viewing the digital content once on a particular client. Thus, the digital content owner is able to control access to content by enforcing a set of access control rules.

However, in some cases an entity other than the digital content owner distributes the content, and thus may wish to enforce its own access restrictions. For example, a cable broadcaster might apply a set of access control rules to digital content such as television programs and advertisements that are not owned by the cable broadcaster. In such cases, the access control rules of the content distributor may be inconsistent with the desires of the content owners.

In many cases, the content distributor will be distributing digital content from many different content owners, and thus it can be very difficult to apply content restrictions that are appropriate for all entities. For example, if the most restrictive access control rules are applied when the access control rules are inconsistent, then an entity that desires less restrictive access control will not be satisfied.

SUMMARY

Techniques are disclosed herein for applying different content protection schemes to different segments of digital content. A method for protecting digital content includes determining segments within digital content that is organized to allow presentation in a certain order. Each of the segments is assigned to a category that has a different content protection scheme associated therewith. One of the protection schemes is applied to each segment based on the category assigned to the segment.

In another aspect, a device has storage that stores digital content to be processed by the device. The digital content is organized to allow presentation in a certain order. The device has an enforcement mechanism that enforces a content protection scheme that restricts certain actions from being performed with respect to the digital content. The device has logic that separates the digital content into a group of protected segments for which the certain actions are prohibited and a group of unprotected segments for which the certain actions are permitted. The enforcement mechanism allows attempts to perform restricted actions with respect to a portion of the digital content to be completed if the portion is entirely within one or more unprotected segments and prevents the attempts from being completed if the portion is within a protected segment.

In another aspect, a computer readable medium has stored instructions which, when executed on a processor, cause the processor to perform content protection of digital content. The digital content has embedded content protection information that indicates that content in certain segments is to have a content protection scheme that allows certain actions that are otherwise restricted. If a request is received from a user to perform one of the restricted actions with respect to a portion of the digital content, a determination is made as to whether the portion is within one or more of the segments. If the portion is within one or more of the segments, the restricted action is permitted. Otherwise, the restricted action is prevented.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Architectural Overview

Figure 1:
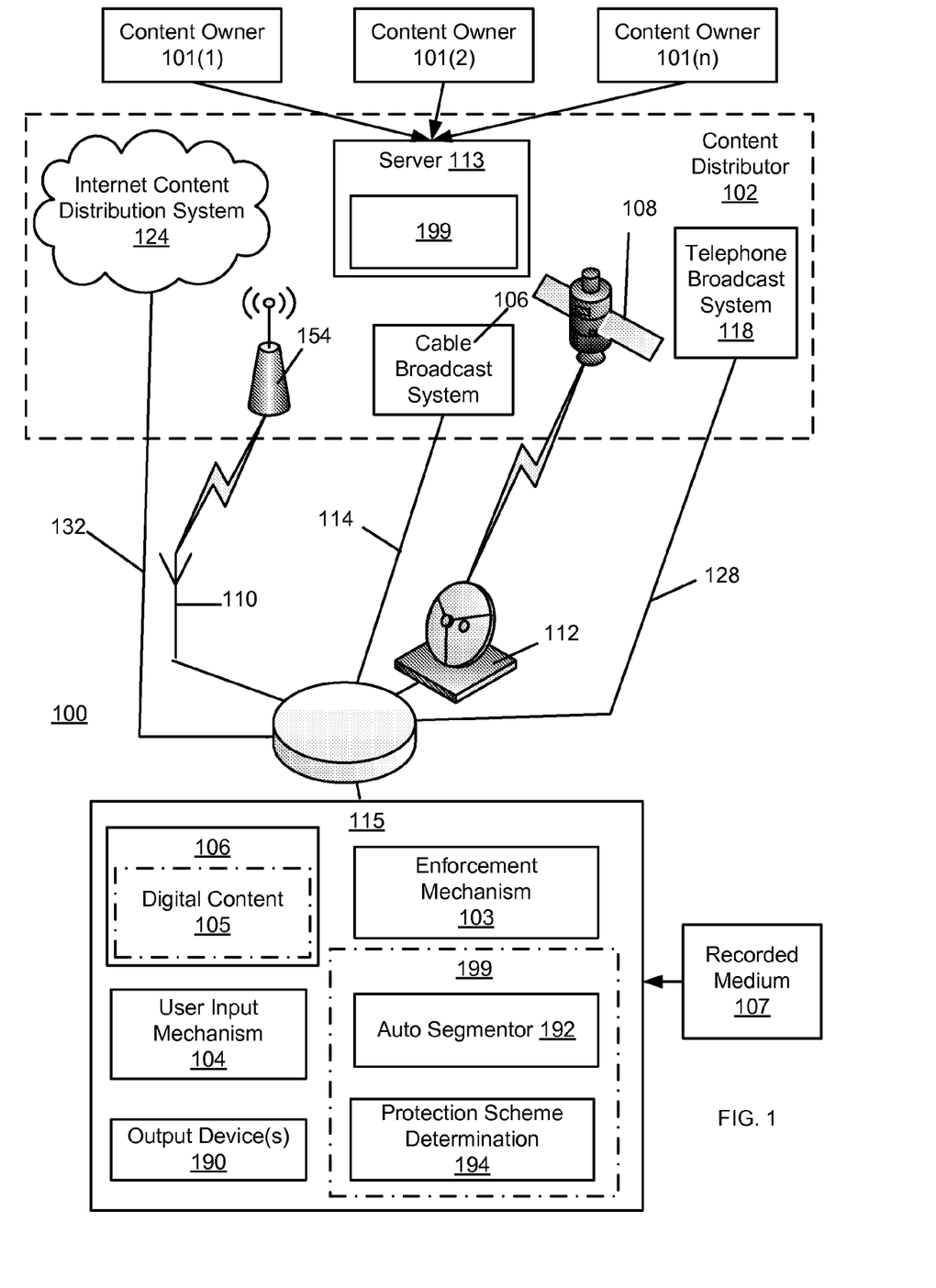
FIG. 1 depicts one embodiment of a system for applying digital content protection on a segmented basis.

FIG. 1 depicts a system 100 for applying digital content protection on a segmented basis. Applying content protection on a segmented basis allows different content protection schemes to be applied to content that originates from different content owners 101. However, note that in some cases, a single content owner 101 desires different schemes to different portions of the content it provides. Moreover, this technique allows a content distributor 102 that does not own the digital content it distributes to apply content protection schemes that are consistent with its own interests and those of the content owners 101.

The content distributor 102 receives content from one or more content owners 101(1)-10(n) and distributes the content to a client 115 that allows a user to receive and play the content 105 on the output device(s) 190. The content 105 is typically in digital format when at the client 115, and hence will be referred to herein as digital content. However, the content 105 can be changed between analog and digital format at any point in the system 100 by the use of analog-to-digital converters or digital-to-analog converters.

The content can be delivered to the client 115 through a variety of mechanisms including, but not limited to, a cable broadcast system 106, a satellite broadcast system 108, telephone content distribution system 118, an antenna-based broadcast system 104, and an Internet content distribution system 124. To receive the content, the client 115 is connected to a variety of mechanisms including a cable connection 114, a satellite dish 112, a switched telephone network 128, and an Internet connection 132. The user input device 104 allows the user to request the digital content 105 from the distributor 102. The input device 104 also allows the user to attempt various actions such as copying the content 105 or re-distributing the content 105 to another user or client 115.

The digital content 105 may also be distributed to the client 115 by a recorded medium 107, such as a Digital Versatile Disc (DVD), Compact Disk (CD), flash memory, etc. Thus, the recorded medium 107 could be a disc or the like that the user has purchased or rented. Alternatively, the recorded medium 107 could be content that is recorded on a computer readable medium that is a permanent part of the client 115 or coupled to the client 115 (e.g., in another electronic device). For example, the content distributor 102 may send video to the client 115 ahead of time, where it is stored for the user to view later. The storage medium 107 can be either volatile or non-volatile.

The content distributor 102 typically receives a fee for providing the digital content 105 to the client 115, and thus has an interest in controlling access to the digital content 105 even though the distributor 102 does not own the digital content 105. Typically, a content owner 101 holds a copyright to the content it provides, and thus has an interest in controlling access. However, those interests are not necessarily the same as those of the content distributor 102. For example, the content distributor 102 might be satisfied to apply a very restrictive set of rules that prevent a user from recording the content and/or distributing the content to another user or another device. However, the content being distributed might originate from a first content owner 101 that wants restrictive access control and a second content owner 101 that would prefer no restrictions. For example, the owner of a television episode might want restrictive access control, whereas an advertisement owner might want the user to be free to copy or re-distribute the advertisement. While the content owner 101 and content distributor 102 are illustrated in FIG. 1 as separate entities, in some cases the content owner 101 and content distributor 102 are the same entity.

Segment based content protection allows some segments of the digital content 105 (e.g., portions of a television program) to receive one type of protection and other segments (e.g., advertisements) to have another type of protection. In general, the determination of what content protection is to be applied to what segments can be made anywhere in the system 100. In one embodiment, the server 113 at the content distributor 102 determines suitable protection schemes for each segment. The server 113 may also automatically divide the digital content 105 into segments.

The enforcement mechanism 103 in the client 115 enforces the protection scheme for each segment of the digital content 105 being played on the client 115. For example, the enforcement mechanism 103 enforces rules that allow advertisements to be freely distributed or copied, whereas other content is not. In one embodiment, the enforcement mechanism 103 has a license evaluator to determine whether the user has license to play the digital content 105. The rules and requirements in the license can specify whether the user has rights to play the digital content 105 based on who the user is, where the user is located, what type of client 115 the user is using, the date, the time, etc. In addition, the rules and requirements of the license may limit the user to a pre-determined number of plays, or pre-determined playtime.

As previously mentioned, it is not required that the server 113 at the distributor 102 segment the digital content 105 and determine protection schemes for the segments. In one embodiment, the auto segmentor 192 in the client 115 automatically segments the digital content 105 and the scheme determination 194 determines an appropriate protection scheme for each segment. As an example, the auto segmentor 192 automatically determines where the advertisements are located, and the scheme determination 194 then assigns the advertisement segments a protection scheme that allows free distribution of the advertisements. Together the auto segmentor 192 and the scheme determination 194 form a segment based protection scheme mechanism 199. Note that the segment based protection scheme mechanism 199 can reside anywhere in the system 100, such as in the distributor's server 113.

In one embodiment, to implement the auto segmentor 192 and scheme determination 194, the client 115 or server 113 execute computer readable instructions that are stored on computer readable media. In one embodiment, to implement the enforcement mechanism 103, the client 115 executes computer readable instructions that are stored on computer readable media. Computer readable media can be any available media that can be accessed by the client 115 or server 113. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the computer readable instructions and which can accessed by the client 115 or server 113.

The client 115 has storage 106 that stores the digital content 105 when it is being processed by the enforcement mechanism 103, auto segmentor 192, and protection scheme determination 194. The storage 106 is any computer readable medium accessible to the client 115. Note that the storage 106 may be a different computer readable medium than the one used to store the computer readable instructions.

For simplicity, the client 115 is depicted as a single block; however, the client 115 may be implemented with several components. Examples of different components that can be used to implement the client 115 include, but are not limited to, a set top box (STB), television or radio receiver, digital video recorder (DVR), digital versatile disc (DVD) player (also know as a digital video disc player), personal computer, video cassette recorder (VCR), cellular telephone, display screen, audio speakers, etc.

Example of Segmented Content Protection

Figure 2:
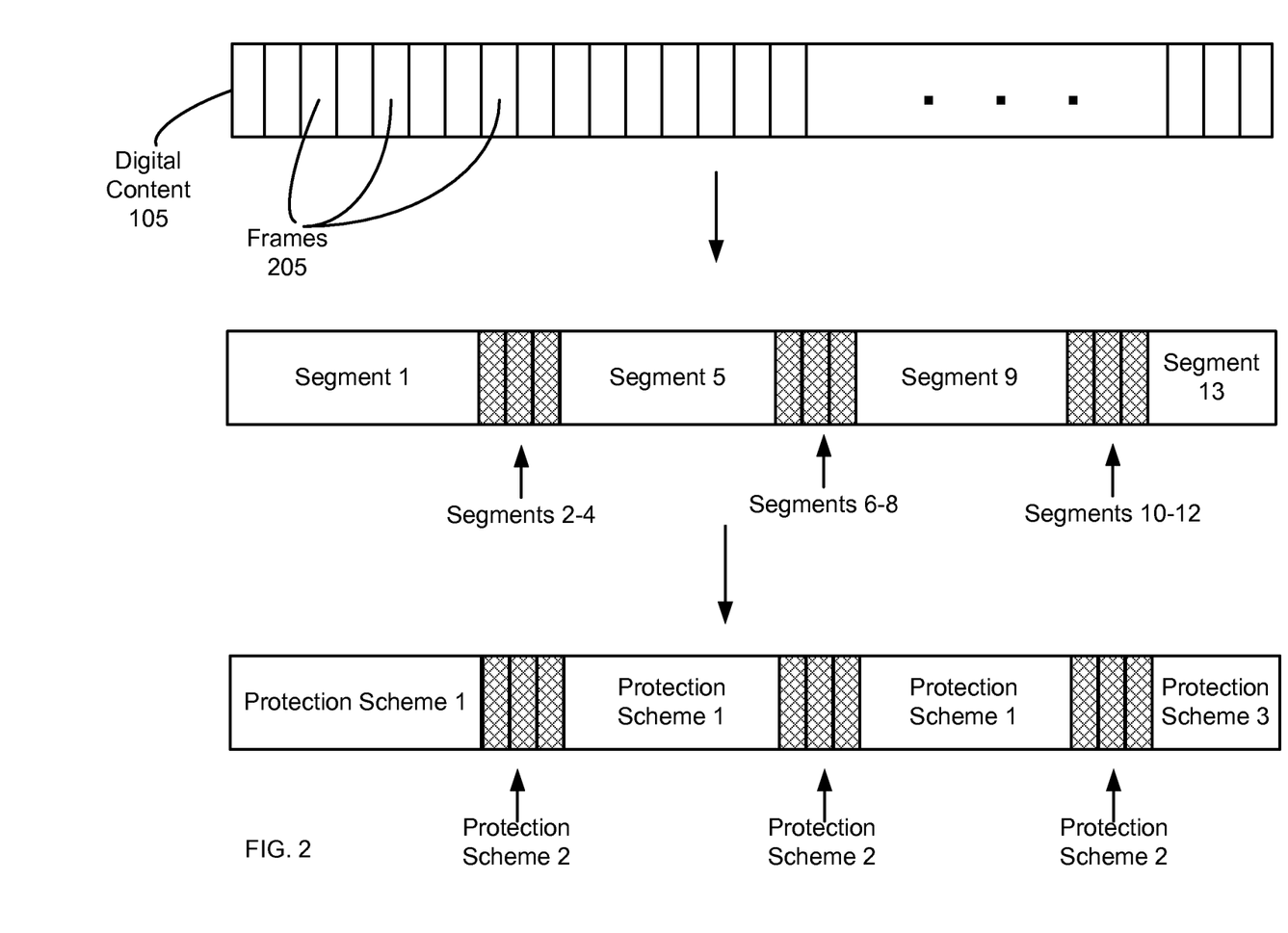
FIG. 2 illustrates an example of assigning different content protection schemes to different segments of digital content.

FIG. 2 illustrates an example piece of digital content 105 to which different protection schemes have been applied to different segments. The digital content 105 is organized to allow presentation in a certain order. In the example of FIG. 2, the digital content 105 includes a sequence of frames 205, which are intended to be presented in a certain order. For example, audio-video content typically contains video frames 205 that are ordered to allow the video frames 205 to be presented in a certain order. The audio-video content may also contain a sequence of audio frames 205 for the audio content, which are played in a certain order to recreate the audio portion of the audio-video content.

However, the digital content 105 is not limited to being audio-video content. In one embodiment, the digital content 105 contains audio content, but no video content. Moreover, the digital content 105 is not required to contain frames 205. In one embodiment, the digital content 105 is an e-book.

Further, while the digital content 105 is organized to allow presentation in a certain order, it is not required that the digital content 105 be played at the client 115 in the certain order from the beginning to the end. For example, a user watching a movie may be allowed to skip over some of the frames 205 or to "re-wind" in order to re-play some of the frames 205. As another example, a user listening to an audio compact disc may be allowed to alter the order in which the individual songs are played. Note that in this latter example, there is a default order in which the songs are played.

Figure 3A:
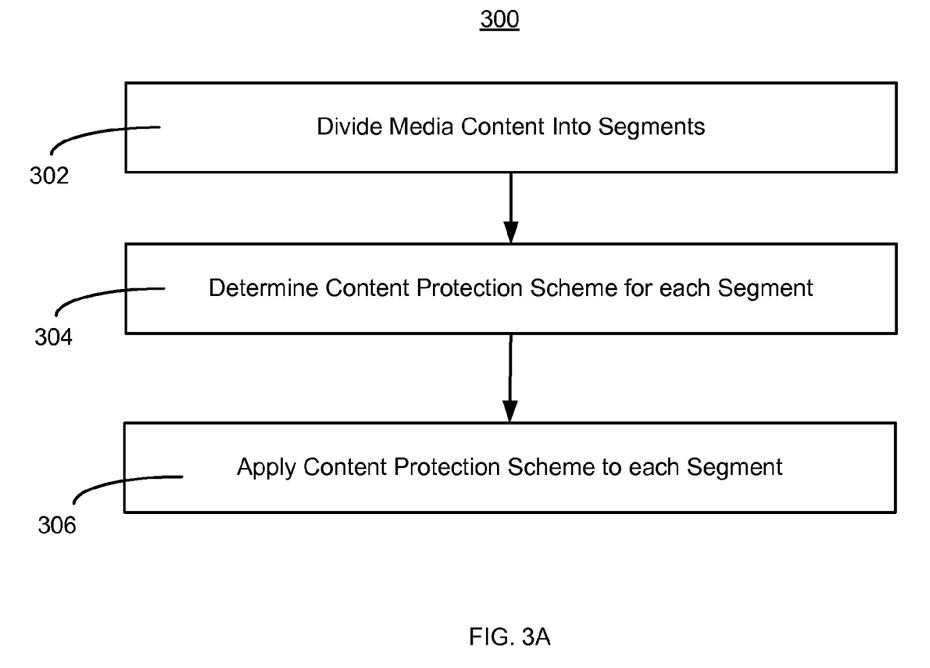
FIG. 3A depicts one embodiment of a process of protecting digital content on a per-segment basis.

FIG. 3A depicts one embodiment of a process 300 of applying segmented content protection. The example of FIG. 2 will be used in the discussion of process 300. In particular, an example will be discussed in which the digital content 105 is a television episode that contains four "program" segments and nine "non-program segments". The program segments contain the television episode itself and the non-program segments contain content such as advertisements. Portions of process 300 may be implemented by the auto segmentor 192, the scheme determination 194, and the enforcement mechanism 103.

In step 302, the auto segmentor 192 divides the digital content 105 into segments. In the example of FIG. 2, the auto-segmentor 192 divides the digital content 105 into 13 different segments. In one embodiment, the digital content 105 arrives at the auto segmentor 192 "pre-segmented." By pre-segmented it is meant that there is information associated with the digital content 105 that identifies the boundaries of the segments. For example, the owner 101 (or other entity) determines the boundaries of the segments and provides information to the auto segmentor 192 to identify the segments. As a particular example, the entity determines where the boundaries should be by identifying different types of content (e.g., program or advertisement). The pre-segmenting can be performed manually (e.g., by a human) or semi-automatically (e.g., in part by a human and in part by an automatic editorial process).

The entity associates segment information with the digital content 105 to identify the boundaries of the segments. The auto segmentor 192 reads the segment information that is associated with the digital content 105 to identify the segments. For example, the auto segmentor 192 detects a flag or trigger placed in the digital content 105 by, for example, the owner 101. Thus, in one embodiment, the auto-segmentor 192 divides "pre-segmented" digital content 105 into different segments based on information associated with the digital content 105.

However, it not required that any special information (e.g., flags, triggers) be added to the digital content 105 to identify the segments. Thus, the digital content 105 that is received by the auto-segmentor 192 is not always pre-segmented. In another embodiment, the auto-segmentor 192 analyzes the digital content 105 to determine where the segments are located. Using the example in which the digital content 105 is divided into different segments based on program content or non-program content, the auto-segmentor 192 is able to automatically detect the presence of advertisements in the digital content 105.

The following are example factors that can be used to detect a boundary between segments. Detecting a boundary between a program segment and a non-program will be used as an example. Typically, closed-captioning is only done during a program segment. Therefore, whether the content has closed-captioning or not may be a factor. Advertisements (non-program) are typically louder than the program. Therefore, the volume (peak, average, minimum, etc.) of the audio track may be a factor. Further, changes in the ways in which the content is encoded can signal a boundary. For example, the format for some video contains "keyframes" that contain data for the entire image of that frame and "inter-frames" that contain only data for changes to the image from one frame to the next. The number of inter-frames between key frames is variable for some video protocols. Moreover, the number may be a function of the type of content. Thus, the number of inter-frames between key frames in program segments may be different from the number for non-program segments. Any combination of the foregoing factors may be used. Further, the boundary is not limited to program versus non-program content.

In step 304, a content protection scheme is determined for each of the segments. In the example of FIG. 2, a first example content protection scheme is assigned to program segments 1, 5, and 9. The first example content protection scheme allows the segments to be viewed once by an authorized user, but not copied or distributed. A second example content protection scheme is assigned to non-program segments 2-4, 6-8, and 10-12. The second example content protection scheme allows the segments to be freely copied and distributed. A third example content protection scheme is assigned to program segment 13. The third example content protection scheme allows an identifier of a segment to be freely distributed, although the content itself cannot be copied or distributed. A possible use for the third example content protection scheme is to allow a television studio to allow a preview of next week's episode of a television program to be freely distributed.

One technique for determining what content protection scheme should be used is by reading protection scheme information embedded in the digital content 105 for the purpose of identifying the protection scheme. The protection scheme information may be located along with the segment information discussed in step 302.

Another technique for determining the content protection scheme is to analyze the digital content 105 without relying on any special protection scheme information embedded therein. In one embodiment, the segments are categorized and the type of protection depends on the category. In one embodiment, the segments are categorized based on the type of content. For example, segments are categorized as either a program segment or a non-program segment. However, there may be many other categories of segments.

Note that both the technique of determining the protection scheme based on the category and reading the embedded content protection information can be used for the same digital content 105. For example, the protection scheme for segments 1-12 may be determined based on the category for those segments. Using the example of FIG. 2, segments 2-4, 6-8, and 10-12 are advertisements, and therefore assigned example content protection scheme 2. On the other hand, normal program segments 1, 5, and 9 are assigned protection scheme 1. However, program segment 13 in FIG. 2 may be assigned example content protection scheme 3 based on content protection information embedded in the digital content 105 by the content owner 101. Note that the content distribution information over-rides the classification of segment 13 as a program segment in this example.

In step 306, the content protection schemes are applied to the digital content 105. In one embodiment, applying the protection schemes to each segment includes associating information with the digital content 105 to indicate what content protection scheme is to be enforced for each of the segments. In one embodiment, a package is formed that contains the digital content 105 and the information that identifies the protection schemes. The package is then provided to the client 115. However, the protection schemes can also be identified by embedding information into the digital content 105. One example of embedded information is a digital watermark. In one embodiment, the digital content 105 is encrypted with a symmetric encryption/decryption key.

Figure 3B:
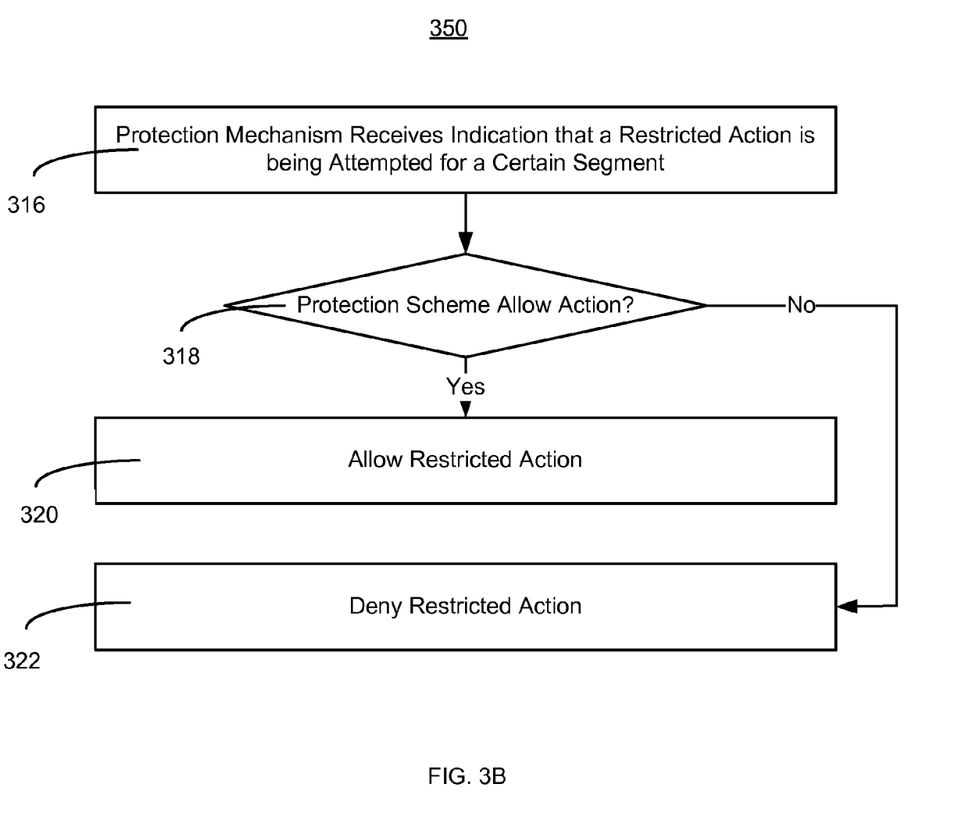
FIG. 3B depicts one embodiment of a process of enforcing content protection schemes on a per-segment basis.

In one embodiment, applying the protection schemes to each segment is includes enforcing the content protection schemes at the client 115. FIG. 3B provides an overview of enforcing content protection schemes for segmented content protection.

Enforcing the Content Protection Schemes

FIG. 3B depicts one embodiment of a process 350 of enforcing content protection schemes for segmented protection. In one embodiment, process 350 is implemented by enforcement mechanism 103 in the client 115. Process 350 is one example of step 306 of process 300. In step 316, the enforcement mechanism 103 receives an indication that a restricted action, such as copying or distributing the digital content 105, is being attempted. As an example, the user attempts to copy a portion of the digital content 105 to a storage medium. As another example, a user attempts to distribute a portion of the digital content 105 to another device or user. In response, the enforcement mechanism 103 identifies which segments the portion falls within.

In step 318, the enforcement mechanism 103 determines whether the attempted action is allowed by the protection scheme for those segments. In an embodiment, the enforcement mechanism 103 determines what access control rules apply for those segments and enforces those rules. If the attempted action is permitted by the protection scheme for each segment the portion falls within, then the enforcement mechanism 103 allows the restricted action in step 320. Otherwise, if the protection scheme for any of the segments does not allow the action, then the enforcement mechanism 103 prevents the restricted action in step 322.

In one embodiment, if the attempted action is permitted for some segments but not others, then the action is allowed segments with the less restrictive protection scheme.

Selective Re-Distribution of Digital Segments

As previously discussed, among the restrictions that may be placed on protected content is the ability to re-distribute digital content 105. In one embodiment, the user is allowed to re-distribute certain segments of the otherwise protected digital content 105. Digital content 105 (or a portion thereof) can be re-distributed from a particular location (e.g., client 115) by either forwarding an identifier of the digital content 105 or the digital content 105 itself.

Figure 4:
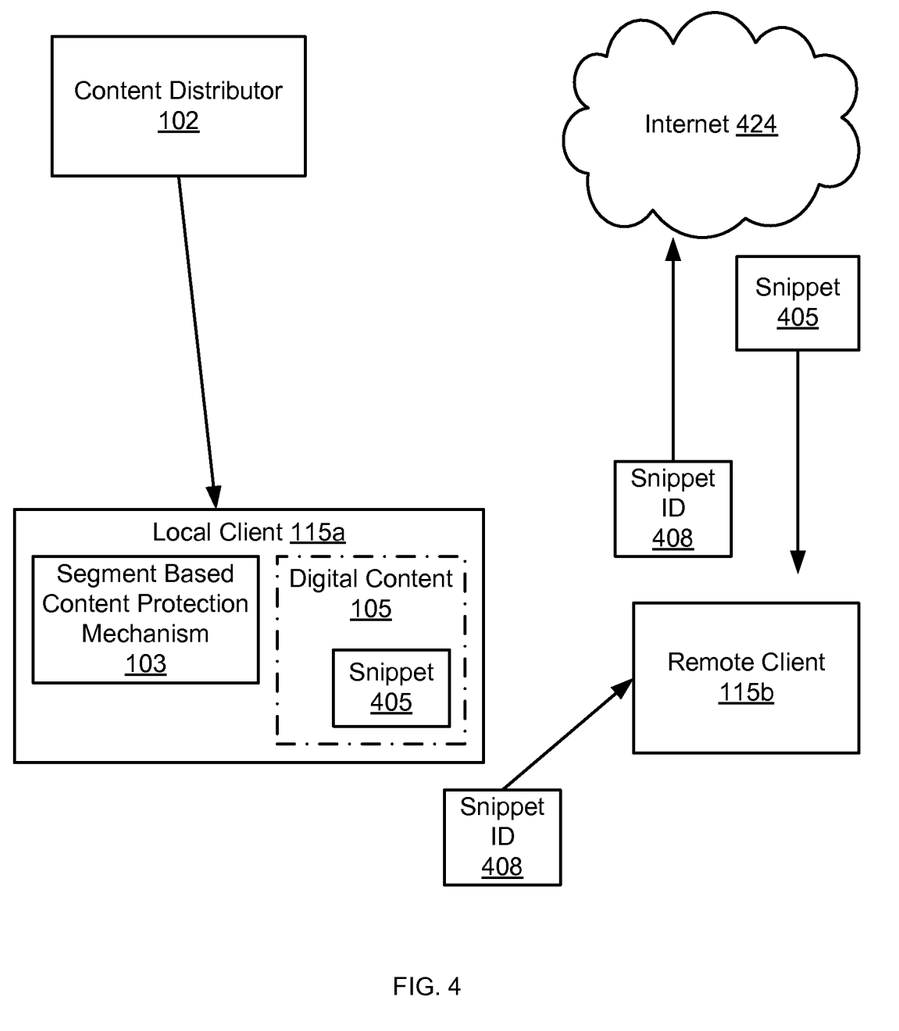
FIG. 4 depicts one embodiment of a user re-redistributing a snippet of digital content.
Figure 5:
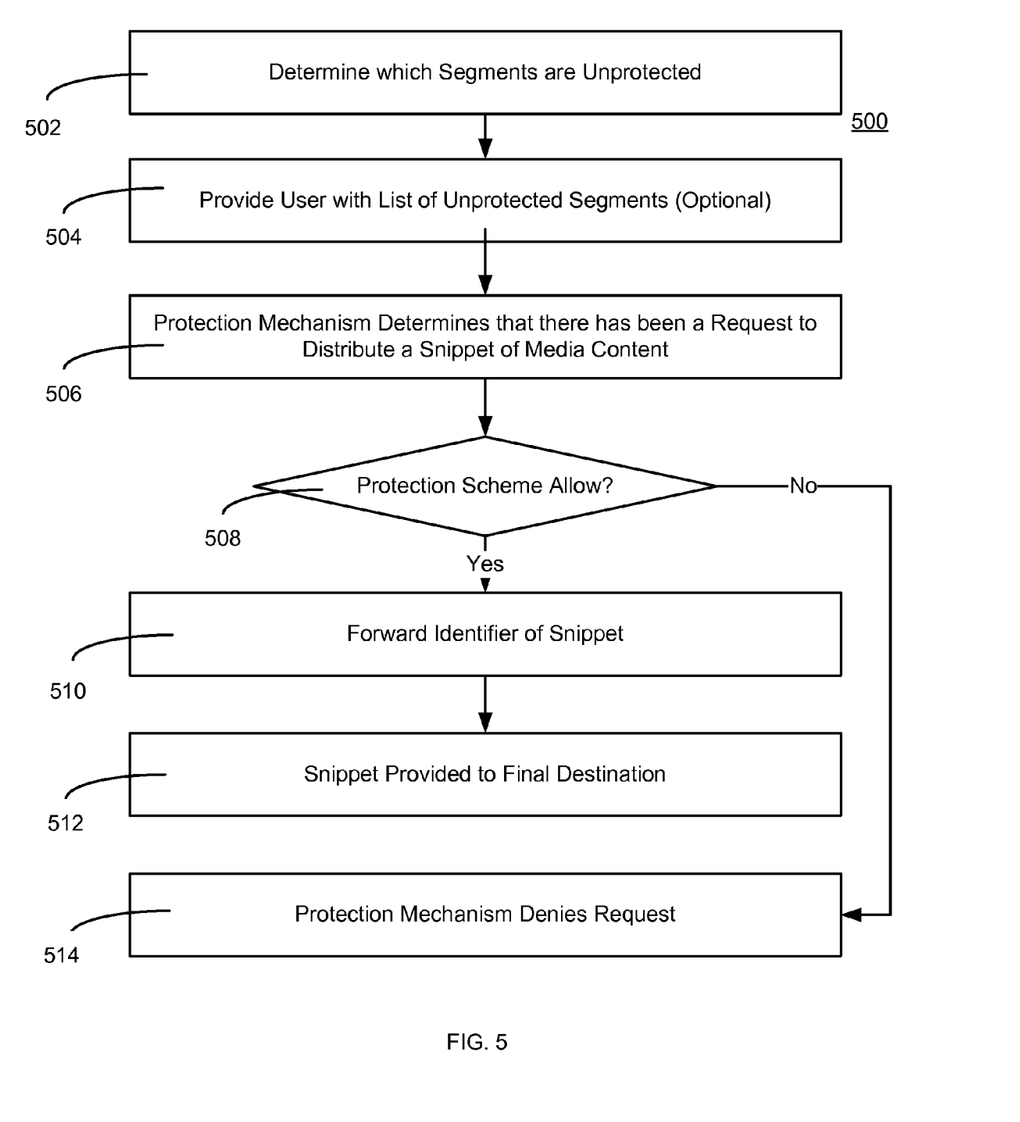
FIG. 5 depicts one embodiment of a process of enforcing a protection scheme that allows re-distribution of digital content.

FIG. 4 depicts one embodiment of a user re-redistributing a snippet 405 of digital content 105. A snippet 405 is at least a portion of one segment. However, a snippet 105 may contain multiple segments. In FIG. 4, a user that is playing digital content 105 on the local client 115a wishes to allow a friend to play the snippet 405 on the remote client 115b. However, the friend does not have authorization to play the entire digital content 105. As examples, the snippet 405 may be an advertisement, a movie preview, or an unprotected episode of a television program that is normally protected. FIG. 5 will be discussed in conjunction with process 500 of FIG. 5.

FIG. 5 depicts a process 500 of one embodiment of enforcing a protection scheme that allows re-distribution of certain segments of the digital content 105. In one embodiment, process 500 is performed by the enforcement mechanism 103. In step 502, a determination is made as to which segments are unprotected. An unprotected segments is one for which normally restricted actions (e.g., copying, re-distributing) are permitted. In one embodiment, protection scheme information that is embedded in the media content is read to determine which segments are unprotected.

In step 504, the user is provided with a list of unprotected segments. As an example, when the user inserts a DVD into the client 115, the main menu has a heading entitled "freely distributable scenes". Upon selecting the heading, the user is presented with a list of scenes that can be selected and distributed as described below. Such a list might also be included in the details of a program guide that describes what programs are on each channel. Many other techniques can be used to inform the user about freely distributable scenes. Step 504 is optional.

In step 506, the enforcement mechanism 103 determines that there has been a request to re-distribute a portion of the digital content 105. As an example, while watching a television program, the user causes the client 115 (or server 113) to save a marker of at least a portion of that episode. The marker is information that identifies the episode, the segment(s), or other portion of the digital content 105. The marker functions like a "bookmark" that is commonly implemented by Internet browsers. Thus, after watching the episode the user is able to access a list of these markers. In one embodiment, one of the actions the user can request with respect to a marker is to forward an Internet link to another user that allows the other user to view the portion of the episode identified by the marker. This is just one example of how the user might make a request to re-distribute a portion of the digital content 105.

In step 508, the enforcement mechanism 103 determines whether the segments that correspond to the portion are allowed to be re-distributed. If the segment(s) are permitted to be re-distributed, then the enforcement mechanism 103 allows a snippet ID 408 to be forwarded in step 510. In the example of FIG. 4, the snippet ID 408 is forwarded from the local client 115a to the remote client 115b.

In step 512, the remote client 115b uses the snippet ID 408 to obtain the snippet 405. In one embodiment, the snippet 405 is forwarded using Internet Protocol television (IPTV). IPTV is a two-way digital broadcast signal that may be sent through, for example, a switched telephone network (FIG. 1, 128) or cable network (FIG. 1, 114) by way of a broadband connection.

If the segments are not permitted to be re-distributed, then the enforcement mechanism 103 denies the user's request to forward the snippet ID 408.

Example Broadcast Electronic Device

Figure 6:
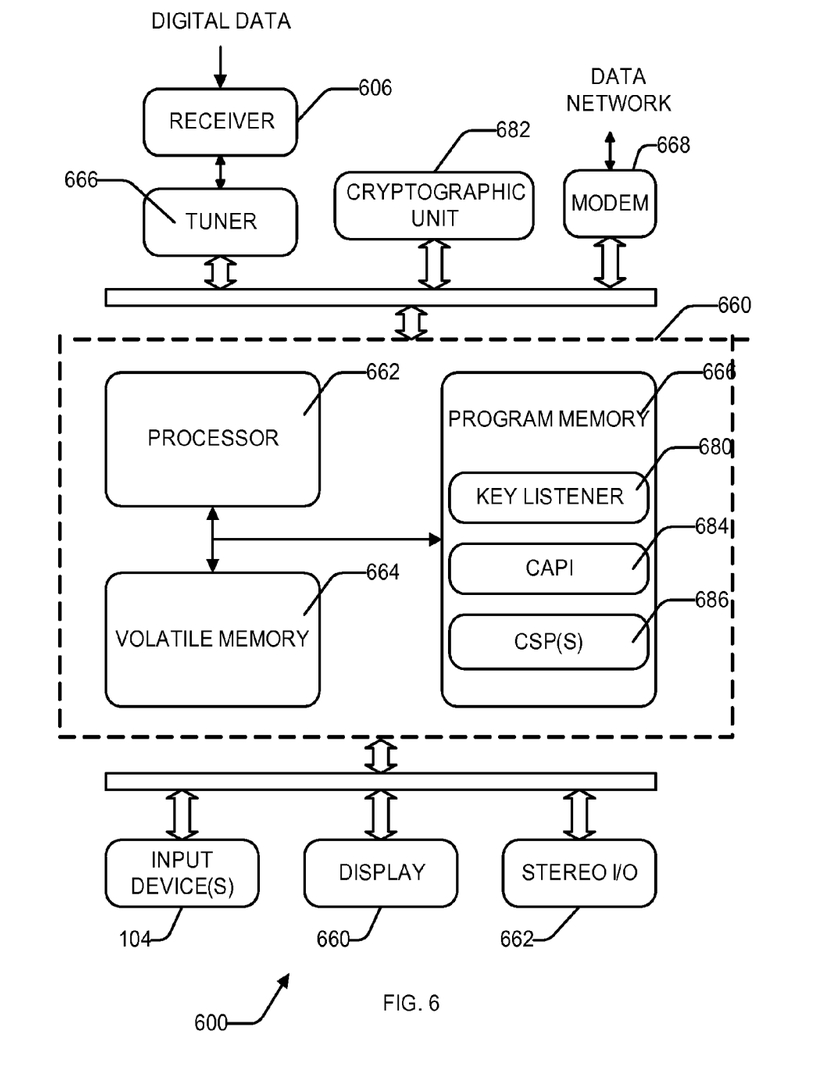
FIG. 6 shows an example configuration of a broadcast-enabled computer that serves as a platform for some embodiments of the present invention.

At least some of the embodiments disclosed herein may be implemented on client 115. FIG. 6 shows an example configuration of a broadcast-enabled electronic media device 600 that may serve to implement at least a portion of the client 115. Device 600 includes a central processing unit 660 having a processor 662, volatile memory 664 (e.g., RAM), and program memory 666 (e.g., ROM, Flash, disk drive, floppy disk drive, CD-ROM, etc.). The device 600 has one or more input devices 104 (e.g., keyboard, mouse, etc.), a video display 602 (e.g., VGA, SVGA), and a stereo I/O 672 for interfacing with a stereo system.

The device 600 includes a digital broadcast receiver 606 (e.g., satellite dish receiver, RF receiver, microwave receiver, multicast listener, etc.) and a tuner 676 which tunes to appropriate frequencies or addresses of the broadcast network. The tuner 676 is configured to receive digital broadcast data in a particularized format, such as MPEG-encoded digital video and audio data, as well as digital data in many different forms, including software programs and programming information in the form of data files. The device 600 also has a modem 678, which provides dial-up access to the data network 628 to provide a back channel or direct link to the server 113. In other implementations of a back channel, the modem 678 might be replaced by a network card, or an RF receiver, or other type of port/receiver that provides access to the back channel.

The device 600 runs an operating system that supports multiple applications. The operating system may be a multi-tasking operating system that allows simultaneous execution of multiple applications. The operating system may employ a graphical user interface windowing environment that presents the applications or documents in specially delineated areas of the display screen called "windows."

The device is illustrated with a key listener 680 to receive the authorization and session keys transmitted from the server 113. The keys received by listener 680 are used by cryptographic security services implemented in the protection mechanism 103 in the client 115 to enable decryption of the session keys and data. Cryptographic services are implemented through a combination of hardware and software. A secure, tamper-resistant hardware unit 682 is provided external to the CPU 660 and two software layers 684, 686 executing on the processor 662 are used to facilitate access to the resources on the cryptographic hardware 682.

The software layers include a cryptographic application program interface (CAPI) 684 that provides functionality to any application seeking cryptographic services (e.g., encryption, decryption, signing, or verification). One or more cryptographic service providers (CSPs) 686 implement the functionality presented by the CAPI to the application. The CAPI layer 684 selects the appropriate CSP for performing the requested cryptographic function. The CSPs 686 perform various cryptographic functions such as encryption key management, encryption/decryption services, hashing routines, digital signing, and authentication tasks in conjunction with the cryptographic unit 682. A different CSP might be configured to handle specific functions, such as encryption, decryption, signing, etc., although a single CSP can be implemented to handle them all. The CSPs 666 can be implemented as dynamic linked libraries (DLLs) that are loaded on demand by the CAPI, and which can then be called by an application through the CAPI 684.

Example Computing Platform

Figure 7:
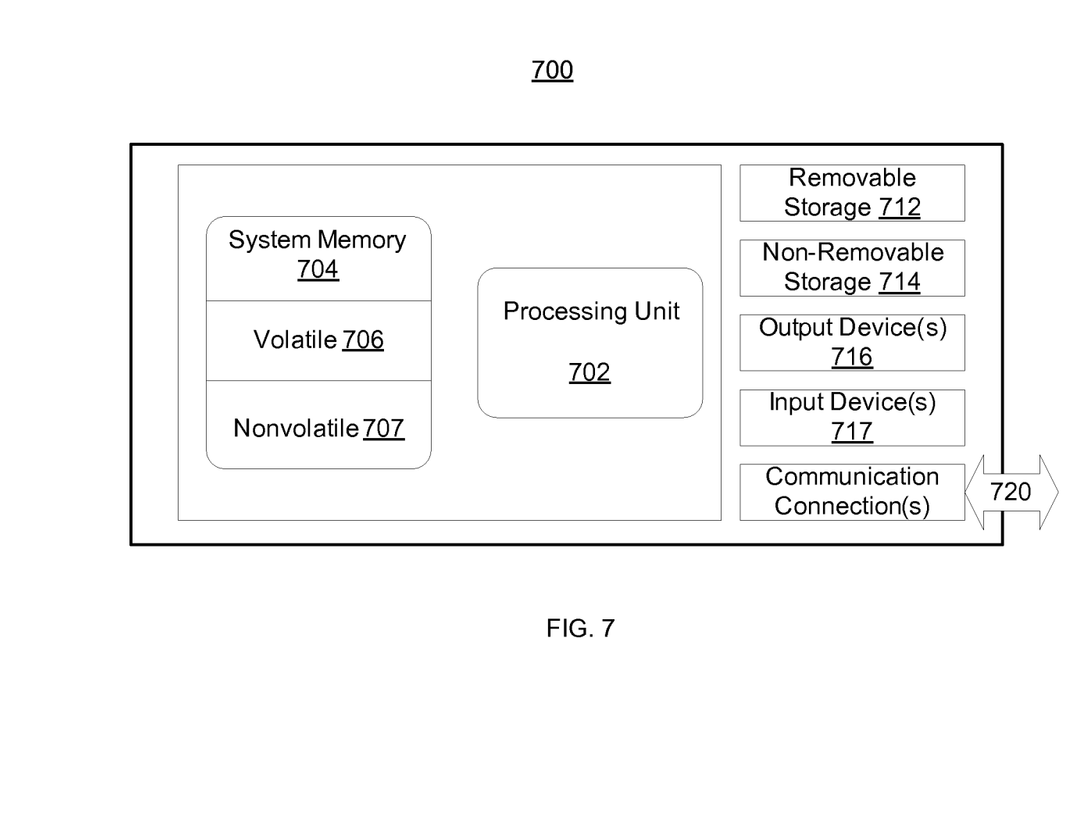
FIG. 7 depicts an example computer system that serves as a platform for embodiments of the present invention

FIG. 7 depicts an example computer system 700 that may serve as a platform for embodiments of the present invention. The server 113 may be implemented with such a computer platform. The example computer system 700 may serve as a platform for the client 115. In its most basic configuration, the computer 700 typically includes a processing unit 702 and memory 704. Depending on the exact configuration and type of computing device, memory 704 may be volatile (such as RAM), non-volatile (such as ROM, flash memory, etc.) or some combination of the two. Additionally, computer 700 may also have mass storage (removable 712 and/or non-removable 714) such as magnetic or optical disks or tape. Similarly, computer 700 may also have input devices 717 such as user input device (FIG. 1, 104) and/or output devices 716 such as output device (FIG. 1, 190). Other aspects of device 700 may include communication connections 720 to other devices, computers, networks, servers, etc. using either wired or wireless media. For example, the server 113 and the client 115 may have a network connection to each other.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A device comprising:
    storage that stores audio-video digital content to be processed by the device, the device is a first device;
    an enforcement mechanism that enforces a content protection scheme that restricts certain actions from be performed with respect to the audio-video digital content, the certain actions include copying and distributing the audio-video digital content; and
    a segment based protection scheme mechanism that divides the audio-video digital content into a group of protected segments for which the certain actions are prohibited and a group of unprotected segments for which the certain actions are permitted;
    the enforcement mechanism allows a first action of the certain actions with respect to a portion of the audio-video digital content to be attempted if the portion is entirely within a first segment of the unprotected segments and prevents the first action from being attempted if the portion is within a protected segment, the first action is sending an identifier to a remote device that is not authorized to play the entire audio-video digital content to obtain a version of the first segment.

2. The device as recited in claim 1, wherein the enforcement mechanism prevents a second action of copying the portion of the audio-video digital content.

3. The device as recited in claim 1, wherein:
    the first action is exporting information that allows an entity that is not authorized to play the entire audio-video digital content to play the portion of the audio-video digital content.

4. The device as recited in claim 1, wherein:
    the segment based protection scheme mechanism divides the audio-video digital content based on information embedded in the audio-video digital content to define which portions of the audio-video digital content are to be protected and which portions are to be un-protected.

5. The device of claim 1, wherein the segment based protection scheme mechanism divides the audio-video content into a plurality of content segments and an advertisement segment between two of the content segments, the advertisement segment is the first segment, the plurality of content segments are protected segments.

6. The device as recited in claim 1, wherein the enforcement mechanism prevents a second action of distributing the portion of the audio-video digital content.

7. A computer readable storage device having stored thereon instructions which, when executed on a processor, cause the processor to:
receive audio video content at a client device over a connection from a content distributor;
detect information embedded in the audio video content that indicates that content in certain segments of the audio video content is to have a content protection scheme that allows certain actions that are otherwise restricted, the audio video content includes a sequence of frames that are organized for presentation in a certain order, one or more of the segments is rights protected, one or more of the segments is freely distributable and copyable, each of the segments includes a plurality of the frames;
receive a request from a user to perform a rights restricted action of the certain actions with respect to a first group of frames of the sequence of frames;
determine whether the first group of frames is within one or more of the certain segments;
if the first group of frames are within one or more of the certain segments, allow the rights restricted action to be performed, the rights restricted action is sending an identifier to a remote device that is not authorized to play the entire audio video content to obtain an unprotected version of the first group of frames; and
if the first group of frames are not within one or more of the certain segments, prevent the rights restricted action from being performed.

8. The computer readable storage device as recited in claim 7, wherein:
the rights restricted action is exporting information that allows an entity that is not authorized to play the entire audio video content to play a portion of the audio video content associated with the first group of frames.

9. The computer readable storage device as recited in claim 7, wherein the receiving a request from a user to perform a rights restricted action of the certain actions includes:
receiving a selection of a stored marker that identifies a portion of the audio video content associated with the first group of frames.

10. The computer readable storage device as recited in claim 9, further including instructions which, when executed on the processor, cause the processor to perform:
storing the marker in response to a user request when the user is playing the audio video content.

11. A method comprising:
accessing media content at a client device over a connection from a content distributor, the media content comprising a plurality of segments, a first group of the segments having a first protection scheme for which copying or distributing is prohibited, a second group of the segments having a second protection scheme that allows an identifier of the respective segment to be freely distributed;
receiving a request from a user to send an identifier of a first segment of the segments to a remote device, the identifier allows an unprotected version of the first segment to be obtained;
preventing the identifier from being sent to the remote device when the first segment is in the first group of segments; and
allowing the identifier to be sent to the remote device when the first segment is in the second group of segments that allows an identifier of the respective segment to be freely distributed.

12. The method of claim 11, wherein the second protection scheme prohibits copying or distributing segments in the second group.

13. The method of claim 12, wherein the allowing the identifier to be sent to the remote device when the first segment is in the second group of segments includes:
allowing the identifier to be sent to an entity that is not authorized to play the entire media content.

14. The method of claim 13, wherein the media content includes audio-video content.

15. The method of claim 11, further comprising determining which of the plurality of segments are the first group and which of the plurality of segments are the second group including:
detecting information embedded in the media content that identifies segments that are in the first protection scheme and segments that are in the second protection scheme.

16. The method of claim 11, further comprising determining which of the plurality of segments are the first group and which of the plurality of segments are the second group including:
automatically determining the type of content in each of the plurality of segments.

17. The method of claim 11, wherein the allowing the identifier to be sent to the remote device when the first segment is in the second group of segments that allows an identifier of the respective segment to be freely distributed includes:
providing an Internet link to the first segment.

18. The method of claim 11, wherein the media content includes audio content.

19. The method of claim 11, wherein the media content includes digital content that is organized to allow presentation in a certain order.

20. The method of claim 11, further comprising:
preventing copying the first segment at the client device; and
preventing distributing the first segment from the client device to another device.

* * * * *